United States Patent

Schleipen

[11] Patent Number: 5,930,044
[45] Date of Patent: Jul. 27, 1999

[54] DEFLECTING ELEMENT HAVING A SWITCHABLE LIQUID CRYSTALLINE MATERIAL

[75] Inventor: Johannes J. H. B. Schleipen, Eindhoven, Netherlands

[73] Assignee: U.S. Philips Corporation, New York, N.Y.

[21] Appl. No.: 09/003,040

[22] Filed: Jan. 5, 1998

[30] Foreign Application Priority Data

Jan. 9, 1997 [EP] European Pat. Off. ............. 97200051

[51] Int. Cl.⁶ ............................ G02B 5/18; G02F 1/13
[52] U.S. Cl. .................... 359/573; 359/298; 359/315; 359/566; 349/201; 349/202
[58] Field of Search .................... 359/558, 566, 359/573, 569, 296, 298, 315, 320; 349/196, 200, 201, 202

[56] References Cited

U.S. PATENT DOCUMENTS

| | | | |
|---|---|---|---|
| 4,729,621 | 3/1988 | Matsuoka et al. | 349/202 |
| 4,729,640 | 3/1988 | Sakata et al. | 349/201 |
| 4,919,520 | 4/1990 | Okada et al. | 349/13 |
| 5,013,141 | 5/1991 | Sakata et al. | 349/201 |
| 5,550,663 | 8/1996 | Nishizaki et al. | 359/569 |

FOREIGN PATENT DOCUMENTS

| | | | |
|---|---|---|---|
| 61-86727 | 5/1986 | Japan | 349/201 |
| 61-86731 | 5/1986 | Japan | 349/201 |
| 62-237426 | 10/1987 | Japan | 349/201 |
| 62-293222 | 12/1987 | Japan | 359/566 |
| 2173605 | 10/1986 | United Kingdom | 359/566 |
| 2184560 | 6/1987 | United Kingdom . | |

OTHER PUBLICATIONS

English–language translation, JP 62–293222, Canon Inc. Dec. 1987.

*Primary Examiner*—Cassandra Spyrou
*Assistant Examiner*—John Juba, Jr.
*Attorney, Agent, or Firm*—Steven R. Biren

[57] ABSTRACT

A deflecting element (1) includes a first substrate (3) and a second substrate (5). The two substrates (3) and (5) enclose a liquid crystalline material (7) which is switchable. A surface (13) of one of the substrates (3) facing the liquid crystalline material (7) is provided with a grating structure (15). The other substrate (5) is provided with a plurality of microlenses (21) on a surface (23) facing the liquid crystalline material (7).

4 Claims, 1 Drawing Sheet

DEFLECTING ELEMENT HAVING A SWITCHABLE LIQUID CRYSTALLINE MATERIAL

BACKGROUND OF THE INVENTION

The invention relates to a deflecting element comprising a first substrate and a second substrate enclosing a liquid crystalline material which is switchable, a surface of one of the substrates facing the liquid crystalline material being provided with a grating structure.

The invention also relates to an optical deflector provided with such a deflecting element.

A deflecting element of the type described in the opening paragraph is known from British patent specification GB 2 184 560. The element described in this document comprises a liquid crystalline layer which is enclosed between two electrodes. The surface of one of the electrodes is provided with a grating at the side of the liquid crystalline material. Two effects play a role here. When a light beam passes through a grating, the light beam will be spread into all directions due to diffraction on the grating lines. For a monochromatic, coherent light beam such as, for example a beam of given laser types, destructive interference will occur in given directions and constructive interference will occur in other directions. The angles at which constructive interference occurs are determined by the wavelength of the light and the refractive index of the medium in which diffraction takes place. By changing the refractive index of the medium from which the beam originates and/or of the medium in which the beam arrives, the angle at which the beam leaves the grating can be varied. In accordance with said British patent specification, a switchable liquid crystalline material is therefore provided on the grating. By applying an electric voltage across the liquid crystalline material, the refractive index of the material is changed and the angle at which constructive interference occurs can be adjusted.

A drawback of the deflecting element described above is that, for the beam exiting from the element, a light deflection caused by the difference in refractive index between the two media will occur at the interface between the liquid crystalline material and the second substrate. In this way, the exit angle is only a function of the angle of incidence and is not a function of the refractive index of the liquid crystalline material.

SUMMARY OF THE INVENTION

It is an object of the invention to provide a deflecting element in which the above-mentioned drawback is obviated.

According to the invention, the deflecting element is therefore characterized in that the other substrate is provided with a plurality of microlenses on a surface facing the liquid crystalline material.

A light ray which is now incident on the interface between the second substrate and the liquid crystalline material will enclose an angle of 0° to the normal on this interface so that the ray will be passed without being deflected in an unwanted manner. In this way, the exit angle of the deflecting element can also be related to the refractive index.

The microlenses may be arranged in, for example an array.

The invention further relates to a set of two deflecting elements, which is characterized in that the grating lines of the grating in the first deflecting element and the grating lines of the grating in the second deflecting element are perpendicular to each other.

This provides the possibility of realizing a component with which light within a given spatial angle can be deflected in any desired direction.

The invention further relates to an optical deflector having a plurality of entrance channels whose exits are located in an entrance plane and a plurality of exit channels whose entrances are located in an exit plane, and is characterized in that a deflecting element is present between the entrance plane and the exit plane.

Thus it is possible to switch in a rapid and simple way between different channels while using a relatively simple construction without complex nodes of optical fibers being required. Moreover, the switching voltage is relatively low.

These and other aspects of the invention are apparent from and will be elucidated with reference to the embodiments described hereinafter.

DESCRIPTION OF THE PREFERRED EMBODIMENTS

Figure 1:
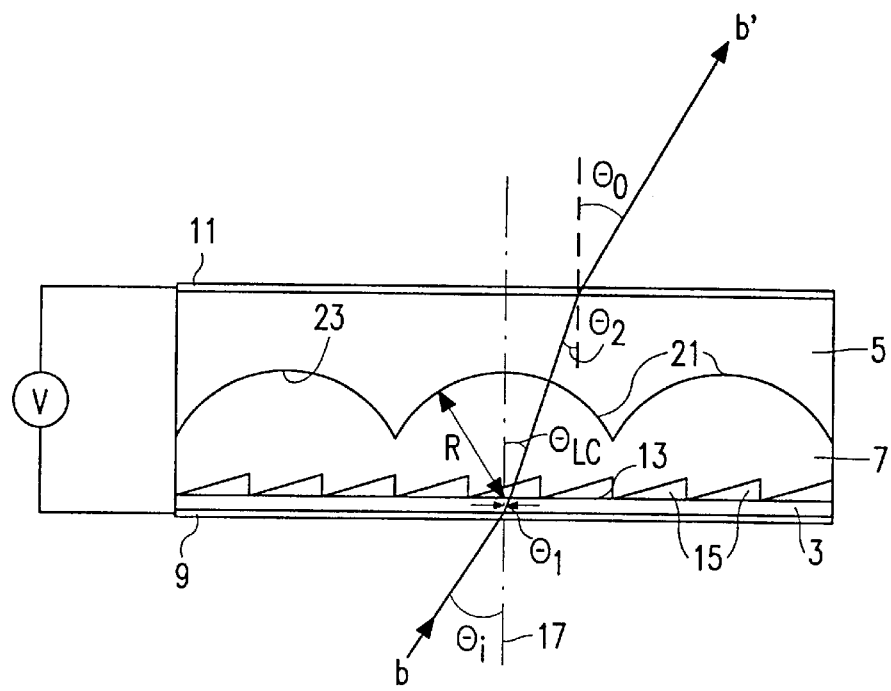
FIG. 1 shows an embodiment of a deflecting element according to the invention.

The deflecting element 1 shown in FIG. 1 has a first substrate 3 and a second substrate 5. A layer 7 of a liquid crystalline material is present between the two substrates 3 and 5.

One of the substrates, for example 3, is provided with a grating structure 15 on its surface 13 facing the liquid crystalline material 7. When a light beam b is incident on the substrate 3 provided with the grating 15, the light ray at the interface between air and the substrate 3 will undergo a refraction. Subsequently, the light beam will be spread into all directions by the grating 7. Dependent on the wavelength of the incident light beam and the refractive index of the medium in which the diffraction takes place, constructive or destructive interference will occur. The grating formula describes the angle dependence of the constructive interference:

$$n_i \cdot \sin \theta_i - n_o \cdot \sin \theta_o = m \cdot \lambda/p$$

from which it follows that $$\theta_o = \arcsin[(n_i/n_o)\cdot(\sin \theta_i) - m \cdot (\lambda/n_o \cdot p)]$$

In this case $\theta_i$ is the angle of incidence with respect to the normal 17 on the grating 7, $\theta_o$ is the angle of the beam of the mth order coming from the grating 7, $n_i$ and $n_o$ are the refractive indices of the media in which the incoming and outgoing beams of the deflecting element are present, $\lambda$ is the wavelength of the light beam, p is the pitch of the grating and m is the diffraction order of the outgoing light beam.

By varying the refractive indices $n_i$ and/or $n_o$, the angle at which constructive interference occurs, hence the angle at which the light beam leaves the grating 7, can be adjusted. Such a change of the refractive index can be realized by providing a switchable liquid crystalline material on the grating. To this end, an electrode 9, 11 is provided on each substrate, via which electrode an electric voltage can be applied across the material by means of a voltage source. As a result, the crystals of the liquid crystalline material will be aligned. Since the liquid crystals are birefringent, the refractive index may vary between the ordinary and the extraordinary refractive index, dependent on the applied voltage.

In the deflecting element 1 according to the invention, a microlens structure whose microlenses 21 have a radius of curvature R is provided in the surface 23 of the second substrate 5 facing the liquid crystalline material. This provides the possibility of not only relating the exit angle $\theta_o$ of the deflecting element 1 to the angle of incidence $\theta_i$ but also to the refractive index of the liquid crystalline material. Namely, since the interface between the liquid crystalline material 7 and the second substrate 5 is curved, the beam incident thereon will enclose an angle of $\theta'_{LC}=0°$ to the normal on this interface and consequently be passed without being deflected. This measure prevents elimination of the angle dependence of the refractive index of the liquid crystalline material.

The microlenses 21 may adjoin each other, as is shown in FIG. 1, but may also be interconnected by means of flat pieces of substrates. The microlens structure may be, for example a microlens array.

The refraction which occurs on the different interfaces in the deflecting element can be described with reference to the following formulas:

$$n_a \cdot \sin\theta_i = n_1 \cdot \sin\theta_1$$

$$p \cdot [n_1 \cdot \sin\theta_1 - n_{LC} \cdot \sin\theta_{LC}] = m \cdot \lambda$$

$$n_{LC} \cdot \sin\theta_{LC} = n_2 \cdot \sin\theta_2$$

$$n_2 \cdot \sin\theta_2 = n_a \cdot \sin\theta_0$$

The angle $\theta_o$ at which the light beam b' leaves the deflecting element 1 is related to $\theta_i$ as follows:

$$\theta_o = arc\ \sin\ [(n_2/n_a.n_{LC}).(n_a.\ \sin\ \theta_i - m.\lambda.p^{-1})]$$

In the above formulas, $n_a$ is the refractive index in air, $n_1$ and $n_2$ are the refractive indices of the substrates 3 and 5, $n_{LC}$ is the refractive index of the layer 7, $\lambda$ is the wavelength of the incident light beam b and p is the pitch of the grating 15.

For example, an angle variation of 10° to 15° can be realized with a deflecting element according to the invention, dependent on the pitch of the grating, the wavelength and the angle of incidence.

By arranging two deflecting elements according to the invention one behind the other, with the directions of the grating lines being perpendicular to each other, a deflecting component can be realized with which a deflection in any desired direction within a spatial angle of approximately 10° can be achieved.

Figure 2:
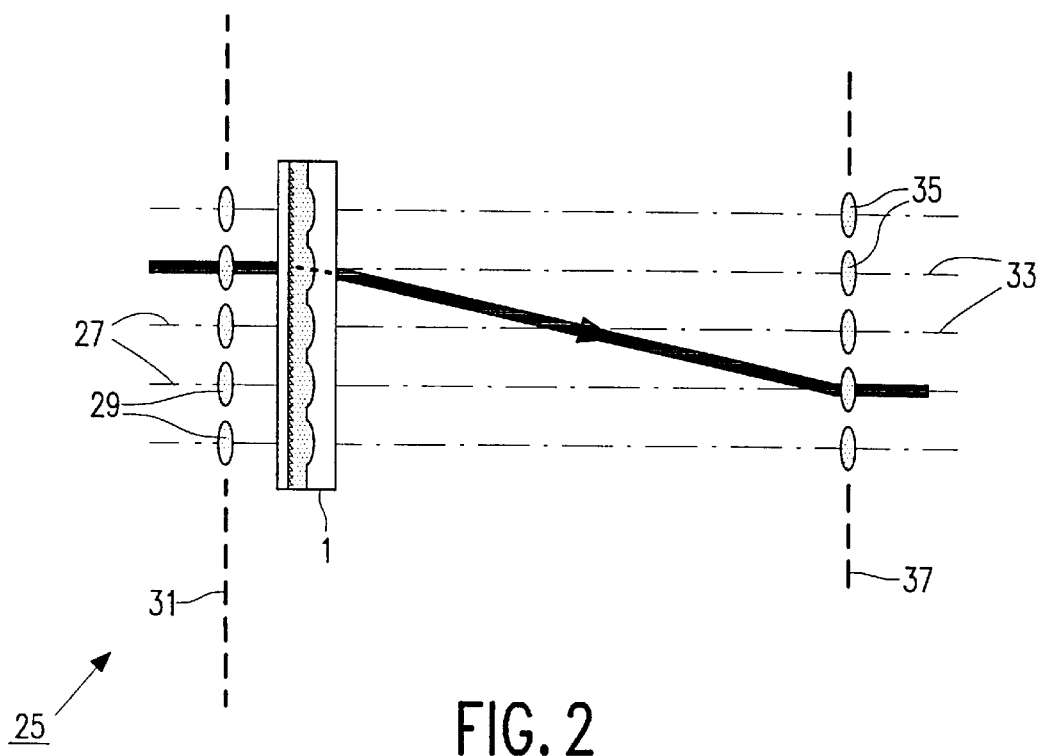
FIG. 2 shows an embodiment of an optical deflector according to the invention.

A deflecting element according to the invention can be used to great advantage in an optical deflector 25, an embodiment of which is shown in FIG. 2. Such a deflector 25 comprises a plurality of entrance channels 27 whose exits 29 within the deflector 25 are located in an exit plane 31, and a plurality of exit channels 33 whose entrances 35 within the deflector are located in an entrance plane 37. By changing the voltage across the deflecting element, light from a given entrance channel can be switched to a selected exit channel.

The channels 27, 23 may be constituted by, for example optical waveguides or optical fibers. The geometry of such a deflector depends on the dimensions of the deflecting element and the requirements imposed on the resolution and crosstalk. For a radius of curvature R=10 μm for the microlens structure, a distance of 40 μm between two entrance channels and a maximum deflection angle of approximately 10°, the deflector is approximately 12 mm long when 50 entrances must be coupled to 50 exits.

Such a deflector may, inter alia, be used to great advantage in optical telecommunication systems in which the transmission, reception and manipulation of optical data is to be realized as efficiently as possible. A deflector as described may be used to present a data packet to a suitable optical fiber. Currently, nodes of optical fibers are used in communication networks. However, this leads to a very complex network structure in a system having many user addresses. This structure can be simplified considerably by substituting the nodes for a deflector according to the invention. An optical signal is then sent from one channel to the other by adapting an electric voltage.

What is claimed is:

1. A deflecting element comprising a first substrate and a second substrate enclosing a liquid crystalline material which is switchable, a surface of one of the substrates facing the liquid crystalline material being provided with a grating structure, characterized in that the other substrate is provided with a plurality of microlenses on a surface facing the liquid crystalline material.

2. A set of two deflecting elements as claimed in claim 1, characterized in that the grating lines of the grating in the first deflecting element and the grating lines of the grating in the second deflecting element are perpendicular to each other.

3. An optical deflector having a plurality of entrance channels whose exits are located in an entrance plane and a plurality of exit channels whose entrances are located in an exit plane, characterized in that a deflecting element as claimed in claim 1 is present between the entrance plane and the exit plane.

4. An optical deflector having a plurality of entrance channels whose exits are located in an entrance plane and a plurality of exit channels whose entrances are located in an exit plane, characterized in that a set of deflecting elements as claimed in claim 2 is present between the entrance plane and the exit plane.

* * * * *